Patented Feb. 9, 1926.

1,572,714

UNITED STATES PATENT OFFICE.

OSCAR FROSELL, OF HACKENSACK, NEW JERSEY, ASSIGNOR, BY MESNE ASSIGNMENTS, TO WILLIAMSPORT BUILDING PRODUCTS CO., OF WILLIAMPSPORT, PENNSYLVANIA, A CORPORATION OF PENNSYLVANIA.

PLASTIC AND PROCESS OF PRODUCING SAME.

No Drawing. Application filed March 25, 1921. Serial No. 455,492.

*To all whom it may concern:*

Be it known that I, OSCAR FROSELL, a subject of Sweden, residing at Hackensack, in the county of Bergen and State of New Jersey, have invented certain new and useful Improvements in Plastics and Processes of Producing Same, of which the following is a specification.

This invention relates to plastics and processes of producing same; and it comprises a hardened and set article composed of hydrated magnesia containing a minor amount of the products of reaction of ammonium chlorid; and it further comprises a method of producing set and hardened articles from magnesia wherein such magnesia is treated with water and a small amount of ammonium chlorid, such amount being usually about that corresponding to such lime as may be present and the mixture is set and hardened under heat and pressure; all as more fully hereinafter set forth and as claimed.

Magnesia (MgO) is readily made from magnesium carbonate by heating, carbon dioxid being expelled and anhydrous magnesia remaining. This magnesia is capable of uniting with water to form a hydrate and under some conditions in so hydrating the mixture of magnesia and water sets to a hard compact mass. The properties of magnesia in this respect, however, differ very materially with the process of preparation; and in particular with the temperature which has been employed in producing the magnesia from the magnesium carbonate. The higher the temperature employed in the expulsion of the carbon dioxid the less readily the magnesia unites with water or hydrates. Much of the magnesia of commerce is made from magnesite; a natural mineral material which always contains more or less calcium carbonate and such magnesia consequently contains more or less lime. However, ordinarily in commercial magnesia the amount of lime does not rise above 10 per cent or so. Other grades of commercial magnesia are made by extraction from dolomite, from sea water and salt spring bitterns, etc. These grades of magnesia also usually contain more or less lime. As a rule the commercial magnesia does not set with water or hydrate readily.

It is an object of the present invention to provide a method of regularly setting and hardening commercial magnesia to form plastic articles for ornamental and general purposes; and to this end advantage is taken of the catalytic action of ammonium chlorid in promoting the hydrating and setting of magnesia into hard and compact bodies with the aid of water. It has been found that magnesia, whatever its origin, on admixture with water and a small amount of ammonium chlorid and exposure to a moderate degree of heat will set regularly and uniformly to a hard material. Ordinarily pressure is employed to further facilitate setting. The reason for the catalytic action of ammonium chlorid in facilitating the setting is not known; but possibly resides in an enhancement of the solvent power of water on magnesia by the ammonium chlorid or by the products of its reaction with the magnesia or with such lime as may be present. Ordinarily not more ammonium chlorid is employed than corresponds to the lime present. The action of lime upon ammonium chlorid ordinarily tends to produce calcium chlorid with escape of ammonia; but in the present process since the articles are ordinarily set in molds or the like under pressure ammonia is not allowed free opportunity to escape. The action of lime on ammonium chlorid is preferential to that of magnesia; and in the present invention by limiting the addition of ammonium chlorid (sal ammoniac) to not above that corresponding to the lime present; say not more than 2 parts of commercial sal ammoniac for every per cent of lime present, formation of magnesium chlorid is avoided. Ordinarily I use very little sal ammoniac. It may be conveniently employed in the water used for setting; using a solution of say 0.5° to 3° Baumé which contains 1 to 7 per cent by weight of ammonium chlorid.

The use of sal ammoniac is not absolutely necessary in setting commercial magnesia reasonably free of lime where setting is under heat and pressure; the heat being above say 212° F.; but such use materially abbreviates the time required and improves the quality of the product. For example, commercial magnesia if made into magma with water and compressed into molds can be made to set in about 30 minutes under, say 80 to 200 pounds steam pressure. Using a hot mold with hydraulic pressure there may be employed from 700 to 3000 pounds pressure; the pressure used depending somewhat on the nature of the filler. The exact time required depends upon the previous history of the magnesia. Using a 1 per cent solution of sal ammoniac in lieu of water, other conditions remaining the same, the same degree of set can be obtained in less than 10 minutes, irrespective of the character of the magnesia.

In the use of the present process, commercial magnesia or magnesia obtained by calcining magnesite, and in finely divided form is made into a plastic mixture with sufficient water for hydration. Ordinarily I dissolve enough ammonium chlorid in the water to take care of whatever lime may be present. The ordinary fillers, such as wood flour, cork, sawdust, rock dust or crushed stone, silica, infusorial earth or kieselguhr, asbestos, etc., and coloring matters may be mixed with the magnesia in such amount as may be desired. For many purposes, 3 to 40 parts of filler may be employed for each part of magnesia. Or the magnesia may be used without fillers where decorative articles are desired.

The plastic mixture may be pressed, tamped, cast or molded into the desired form, (much as is done with Portland cement), in the cold and the articles placed in a steam chamber and steamed, using steam of, say, 125 to 200 pounds. The time of exposure to the steam varies with the thickness and size of the article; but ordinarily I do not continue the exposure more than 15 to 40 minutes. As stated, the use of sal ammoniac materially abbreviates the time required; but in all cases in order to secure sound articles, sufficient time should be afforded to insure penetration of heat to the center of the article. In another method of operation instead of casting, etc., cold and then heating as a separate step, I may combine the operations by compressing the mixture into a hot mold; or by using presses with hot plates.

In one specific embodiment of my invention, I may use by volume 9 parts of magnesium oxid (magnesia), 2 parts of asbestos, 4 parts of kieselguhr, 1 part of wood flour impregnated with China wood oil, 6 parts of ordinary wood flour, 24 parts oak sawdust, 32 parts of pine sawdust and 1 part of ochre, as coloring matter. To this are added 32 parts of ammonium chlorid solution of 1° Baumé. If a molded article is to be made, the above composition is placed in a mold and a pressure of 1500 to 1600 pounds per square inch is applied. It is then steamed for about 20 minutes, using a pressure of about 80 pounds. The molds are cooled by the application of cold water. Usually about 10 minutes time suffices.

In another embodiment I take 10 parts magnesium oxid, 2.5 parts of asbestos fiber, 2.5 parts of kieselguhr, with from 60 to 90 parts of sawdust. These ingredients are mixed dry and from 30 to 40 parts of 1° Baumé solution of ammonium chlorid solution added, to make a pasty or mortar-like mass. This is pressed in a suitable mold under, say, 500 to 2000 pounds pressure per square inch and then steamed with steam at from 90 to 100 pounds pressure. This product can be made in from 10 to 20 minutes.

Any desired coloring matter can be used, such as dyes and the like, lithopone, etc. Where lightness is desired, cork and similar fillers may be used. The proportion of fillers and the characters of fillers may be changed as the exigencies of any particular case demand and, of course, the strength of the ammonium chlorid solution may be calculated in accordance with the lime content of the magnesia. The pressure applied in molding may vary, depending upon the character of the filler and the nature of the article desired.

The character of the product varies somewhat with the character of the filler used, if any; but in all cases the set product is, unlike the ordinary oxychlorid articles, made with the aid of magnesium chlorid, resistant to water. It is not hygroscopic and does not collect dampness under wet weather conditions and does not disintegrate under the influence of moisture. Articles made as described may be soaked in water for weeks or boiled with water for days without materially affecting their hardness or character; nor are they affected by frost. Used without fillers or aggregates, or with hard aggregates, setting is to stonelike hardness; and the material will take a polish like natural marble. It displays many advantages over the ordinary oxychlorid materials in making "artificial marble" and "artificial onyx" being harder and more resistant to soap and water. It may be freely used for outdoor purposes. In use for flooring purposes, it may be directly applied over wood or concrete, being tamped in place by hot tamping tools, and then polished (if desired) in place. For this use, the employment of ammonium chlorid to catalyze quick setting is particularly advantageous.

What I claim is:—

1. The process of producing hard plastic articles which comprises setting calcined magnesia by hydrating with water under simultaneous heat and compacting pressure.

2. The process of producing hard plastic articles which comprises setting calcined magnesia by hydrating with water under simultaneous heat and compacting pressure in the presence of a small amount of ammonium chlorid.

3. The process of producing hard plastic articles which comprises setting calcined magnesia by hydrating with water under simultaneous heat and compacting pressure in the presence of an amount of ammonium chlorid not greater than corresponds to the amount of lime present in such magnesia.

4. A molded article containing fillers and a bonding body of magnesia set by hydrating under simultaneous heat and compacting pressure.

5. A hard molded article comprising a body of hard, dense hydrated magnesia having the characteristics of magnesia set by hydrating with water under simultaneous heat and compacting pressure.

6. The process of producing hard plastic articles which comprises wetting calcined magnesia with water, placing the mixture in a mold and compressing the mixture in the mold while heated.

7. The process of making hard plastic articles which comprises mixing calcined magnesium oxid with fillers to give color and body to the final article, placing the mixture in the mold, and subjecting it to pressure in the mold while simultaneously heating it, cooling the molds, and then removing the finished articles.

In testimony whereof I hereunto affix my signature.

OSCAR FROSELL.